(12) United States Patent
Olson et al.

(10) Patent No.: US 9,302,614 B2
(45) Date of Patent: Apr. 5, 2016

(54) SYSTEM AND METHOD FOR DECELERATION DETECTION AND SIGNALING IN VEHICLES

(71) Applicant: Kinetech LLC, Indianapolis, IN (US)

(72) Inventors: Mark Olson, Indianapolis, IN (US); Larry D. O'Cull, Westfield, IN (US)

(73) Assignee: Kinetech, LLC, Indianapolis, IN (US)

( * ) Notice: Subject to any disclaimer, the term of this patent is extended or adjusted under 35 U.S.C. 154(b) by 0 days.

(21) Appl. No.: 14/293,716

(22) Filed: Jun. 2, 2014

(65) Prior Publication Data

US 2014/0354422 A1    Dec. 4, 2014

Related U.S. Application Data

(60) Provisional application No. 61/829,613, filed on May 31, 2013.

(51) Int. Cl.
*B60Q 1/34* (2006.01)
*B60Q 1/44* (2006.01)

(52) U.S. Cl.
CPC ............ *B60Q 1/445* (2013.01); *B60Q 2900/10* (2013.01)

(58) Field of Classification Search
CPC .................................... B60Q 1/26; B60Q 1/34
USPC ................................. 340/465, 467, 468, 479
See application file for complete search history.

(56) References Cited

U.S. PATENT DOCUMENTS

| | | | |
|---|---|---|---|
| 6,249,219 B1 * | 6/2001 | Perez et al. ................... | 340/467 |
| 6,417,767 B1 * | 7/2002 | Carlson et al. ............... | 340/467 |
| 6,710,709 B1 | 3/2004 | Morin et al. | |
| 7,154,387 B2 * | 12/2006 | Boomershine, III ......... | 340/467 |
| 7,710,254 B1 * | 5/2010 | Hill, III ........................ | 340/479 |

OTHER PUBLICATIONS

Sudden Stop Flashing License Plate Frame, Smarthome Home Automation Superstore, Woodford Industries Product No. SS200601, 2014 SMARTHOME. http://www.smarthome.com/92825/Sudden-Stop-Flashing-License-Plate-Frame/p.aspx.

* cited by examiner

*Primary Examiner* — Toan N Pham
(74) *Attorney, Agent, or Firm* — Maginot Moore & Beck LLP

(57) ABSTRACT

A system for detecting vehicle deceleration having an accelerometer, a processing arrangement, and a deceleration indicator. The processing unit samples data from the accelerometer, and based on that data, determines if the vehicle is braking or otherwise decelerating. If the vehicle is braking or otherwise decelerating in excess of a threshold, the deceleration indicator is activated.

20 Claims, 7 Drawing Sheets

SYSTEM AND METHOD FOR DECELERATION DETECTION AND SIGNALING IN VEHICLES

CROSS-REFERENCE TO RELATED APPLICATIONS

This application claims priority to U.S. provisional patent application No. 61/829,613, the contents of which are incorporated herein by reference.

FIELD

The present disclosure relates generally to a system and method for deceleration detection in vehicles and signaling of such deceleration.

BACKGROUND

In vehicles of all kinds, it is often desirable to be able to detect when the vehicle is braking or otherwise decelerating. Braking can be detected in a variety of ways. One of the effects of braking is the reduction of vehicle speed. When a vehicle is moving at constant speed, the acceleration of the vehicle is zero. When the vehicle's speed is increasing, its acceleration is positive, and when the vehicle's speed is decreasing, its acceleration is negative (also known as deceleration). Brakes generally cause a reduction in speed by causing friction between a brake pad and a rotor or a drum. Specifically, braking creates friction to in order cause negative acceleration of the vehicle.

Measuring the acceleration of the vehicle is an effective way of sensing when the vehicle is braking. One possible method for measuring acceleration is by observing the speed of the vehicle, and how that speed changes over time. The speed of a vehicle can be measured in numerous ways. One method of measuring speed is to measure the distance the vehicle travels over a small amount of time. This distance may be obtained by using GPS device, or the like. Another method of measuring speed is to measure the wind speed. The wind speed may be measured using an anemometer or pitotube measurement tool. Unfortunately, these methods of measuring speed have proven inadequate for accurately detecting small speed changes in a timely fashion, and generally require expensive equipment. Alternatively, speed can be measured by simply reading the value from a speedometer. Typically, the speedometer value may be retrieved from an ODB II port of the vehicle. However, accessing the data from the ODB II port requires an extra device.

In the current market brake light systems are standard on vehicles of various types. These brake light systems are configured to turn on lights that signal individuals to the rear of the vehicle when the user applies the brake. These brake light systems typically include a brake switch, a wire harness and a signal lamp. The brake switch is closed by application of the brake pedal in order to complete a circuit that provides power from the vehicle battery to the signal lamp. The wire harness connects the switch to the signal lamp. The term "brake detection line" may also be used herein to refer to the electrical line in the vehicle connecting the brake switch or a power source to the signal lamp. The signal lamp may be any of various lights, such as an LED light, which provides a visual indication that the vehicle is braking. The advantage of this technology is the accuracy it achieves by directly detecting the physical braking action. Consequently, the visual indicator is turned on or off in perfect synchronization with application of the brakes. Aftermarket products exist that allow vehicle owners to add additional features associated with vehicle braking, such as flashing of the brake lights. However, these products are designed to tap directly into the vehicle's brake light system (e.g., lighting, wiring, electronics, etc.) such that installation of these products may be relatively difficult.

SUMMARY

In at least one embodiment, an arrangement for detecting acceleration events in a vehicle is provided. The arrangement includes an accelerometer, a power supply, a light, and a processing arrangement all carried by or coupled to a housing. The processing arrangement carried by the housing is in communication with the accelerometer. The processing arrangement includes a signal filter configured to process signals received from the accelerometer, and a light controller configured to deliver power from the power supply to the light based on the accelerometer signals processed by the signal filter. None of the power supply, the light and the processing arrangement is coupled to the internal brake light system of the vehicle. A mounting member is carried by the housing and is configured to couple the housing to the vehicle. A calibration member is carried by the housing and configured to deliver a calibration signal to the processing arrangement indicating an orientation of the accelerometer when the housing is mounted in the vehicle.

In at least one embodiment, an arrangement is provided for detecting acceleration events in a vehicle separate from the vehicle brake light system. The arrangement includes a power supply, an acceleration sensor, a light, and a processing unit. The processing unit is in communication with the acceleration sensor and receives signals from the acceleration sensor. The processing unit includes a light controller configured to deliver power from the power supply to the light based on the signals received from the acceleration sensor. A power management device is configured to provide power from the power supply to the light controller only when the acceleration sensor indicates that an acceleration event has a magnitude that is greater than a predetermined threshold. The arrangement further includes a mounting member configured to couple the light to the vehicle.

In at least one embodiment, a method is disclosed for detecting an acceleration event in a vehicle having a brake light system including a brake detection line and at least one brake light coupled to the brake detection line. The method comprises mounting an apparatus for detecting acceleration to the vehicle without coupling the apparatus for detecting acceleration to the brake detection line or the at least one brake light. The method further comprises calibrating the apparatus for detecting acceleration to determine the orientation of the apparatus for detecting acceleration after the apparatus for detecting acceleration is mounted to the vehicle. A processing device is powered up if the magnitude of a signal from a detected acceleration event exceeds a predetermined threshold. Thereafter, the signal from the detected acceleration event is filtered. Power is then provided to a light if the filtered signal from the detected acceleration event is indicative of a vehicle braking event or vehicle turning event.

DETAILED DESCRIPTION

Figure 1:
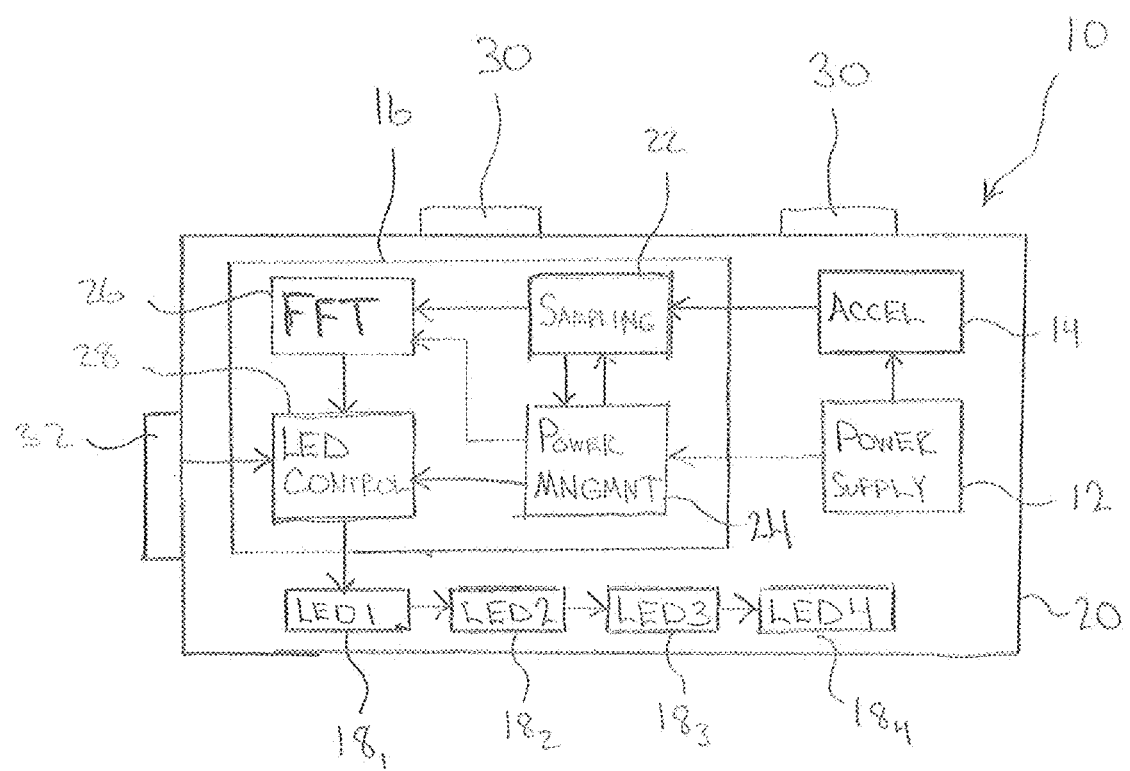
FIG. 1 is a block diagram of an exemplary embodiment of an arrangement for detecting acceleration events in a vehicle.

With reference to FIG. 1, an arrangement 10 for detecting acceleration events is shown. The arrangement 10 comprises a power supply 12, an acceleration sensor 14, a processing unit 16 and a plurality of LEDs 18 all contained within or otherwise carried by a housing 20. The housing is configured to be coupled to a vehicle separate from the vehicle brake light system, including separate from the vehicle battery, the vehicle brake detection line, and the vehicle brake lights. The arrangement 10 is configured to detect a vehicle acceleration event, such as vehicle deceleration resulting from vehicle braking and cause a plurality of LEDs to illuminate to warn rearward drivers of the vehicle braking event. Advantageously, the arrangement 10 is not connected to the brake detection line of a vehicle.

The power supply 12 is carried by the housing 20 and may be provided by any of numerous power supplies capable of providing sufficient power to light a vehicle. For example, the power supply may be a battery, such as a lithium battery capable of providing power to the LEDs and other electronic devices in the arrangement over a long period of time. As another example, the power supply 12 may be an energy harvesting device, such as a solar cell or a piezoelectric device. If the power supply 12 is provided as a solar cell, it is advantageous to mount the arrangement in a location on the vehicle that will receive a sufficient amount of sunlight, such as a vehicle rooftop, rear bumper or other location on an exposed exterior of the vehicle. If the power supply is a piezoelectric device, the power supply may include a number of capacitors used to retain the energy harvested by the piezoelectric device as a result of vehicle movement.

The acceleration sensor 14 is also carried by the housing. In the embodiment of FIG. 1, the acceleration sensor 14 is provided by an accelerometer. The accelerometer 14 may be any of various commercially available accelerometers with sufficient accuracy and precision to detect acceleration events in vehicles. In at least one embodiment, the accelerometer is a 3-axis microelectromechanical system (MEMS) device. A MEMS 3-axis accelerometer typically uses very little power, and thus will not drain the power supply during constant measurements and signaling during vehicle movement. As shown in FIG. 1, the power supply 12 is directly coupled to the accelerometer 14. The accelerometer may be positioned in the housing 20 in a desired orientation that anticipates a forward direction of the vehicle when the user mounts the arrangement 10 within the vehicle. For example, the accelerometer may be positioned in the housing such that a z-axis of the accelerometer will be substantially vertical when the user mounts the arrangement 10 on a rear bumper of the vehicle. However, as explained in further detail below, the arrangement 10 may also include a calibration device that allows a user to calibrate the accelerometer 14 to any of various orientations after mounting the arrangement in the vehicle. While the accelerometer 14 has been disclosed herein as being a 3-axis MEMS accelerometer, it will be recognized that any of various other accelerometers may also be used, including two axis accelerometers. However, it will also be recognized that, depending on the type of accelerometer used, different processing, circuitry and attention to proper mounting may be required. The accelerometer 14 is powered by the power supply 12, but generally uses very little power. Outputs from the accelerometer 14 may include an X-axis output, a Y-axis output, a Z-axis output, as well as a resultant vector output (i.e., a combination of the X, Y and Z-axis outputs).

While an accelerometer is disclosed as the acceleration sensor in FIG. 1, the acceleration sensor may also be provided in other forms. For example, in at least one embodiment, the acceleration sensor 14 is provided in the form of a GPS device. In such embodiments, the GPS device may be housed in common with or separate from the power supply 12 and other components of the arrangement 10 for detecting acceleration events. If the GPS device is housed separately, GPS and/or acceleration signals may be wirelessly transmitted to the processing unit 16 using any of various known wireless communication protocols and devices, such as Bluetooth. In at least one embodiment, the GPS device an after-market or original vehicle equipment tracking device configured to wirelessly transmit the GPS signals. In another embodiment, the acceleration sensor 14 may be a processor that analyzes a speed signal from the ODB II port, or other vehicle monitoring device. In such embodiments, the speed signal from the ODB II port, or an acceleration signal derived therefrom, may be transmitted wirelessly to the processing unit 16 of the arrangement 10 for detecting acceleration events.

The processing unit 16 is also mounted in the housing 20 and is configured to receive signals from the accelerometer 14. The processing unit 16 includes various subsystems including a sampling unit 22, a power management unit 24, a filtering unit 26, and a LED control unit 28. It will be recognized by those of ordinary skill in the art that the processing unit may be provided primarily with the use of electronic hardware components, microprocessors and associated software and firmware, or some combination thereof. The processing unit 16 is carried by the housing 20 and is in communication with the accelerometer 14, which is also carried by the housing 20. A memory (not shown) may also be included in the processing unit or other location in the arrangement, thus allowing signals from the accelerometer 14 to be stored within the device. In the arrangement of FIG. 1, signals from the accelerometer 14 are delivered directly to the sampling unit 22.

The sampling unit 22 is configured to periodically sample the signals from the accelerometer, thus resulting in a digital output from the sampling unit. The period for sampling may be any of various periods as determined by the manufacturer. However, such sampling periods should be sufficiently close together such that acceleration events in the vehicle may be quickly detected and signaled with the light (or other signaling device).

The power management unit 24 is connected to the power supply, and is configured to deliver power to other units that make up the processing unit 16. In the embodiment of FIG. 1, the power management unit 24 is configured to receive signals from the sampling unit 22. In order to save on power consumption, the power management unit only provides power to the filtering unit 26 and the LED control unit 28 when the sampled signal output from the accelerometer exceeds a predetermined threshold (e.g., a predetermined amplitude). For example, if the resultant vector output from the accelerometer is less than 1.4 Gs, the power management unit 24 will deprive the filtering unit 26 and the control unit 28 of power, recognizing that no significant acceleration event has occurred. However, when the output of the sampling unit is greater than the predetermined threshold, the power management unit 24 allows power to be provided to both the filtering unit 26 and the control unit 28, which are quickly powered-up and perform their intended functions after the acceleration signal exceeds the predetermined threshold.

The filtering unit 26 is configured to process signals received from the accelerometer 14 via the sampling unit 22. In particular, the filtering unit 26 performs low-pass filtering on the signals from the accelerometer 14. This low-pass filtering is intended to remove noise from the accelerometer signals that result from vibration during operation of the vehicle. In the embodiment of FIG. 1, the low pass filtering is performed using a fast-Fourier transform algorithm. However, it will be recognized by those of ordinary skill in the art that other filtering methods may be utilized. The number of signals from the accelerometer 14 that are processed by the processing unit 16 may depend on various factors including the orientation of the housing 20 on the vehicle, and the event to be detected by the arrangement 10. In some embodiments, all signals from the accelerometer 14 may be filtered and processed for analysis of an acceleration event. In other embodiments, only a limited number of signals from the accelerometer 14 may be processed. For example, in at least one embodiment, the resultant vector of the accelerometer is the only signal that is analyzed to determine an acceleration event.

The LED control unit 28 is configured to deliver power from the power supply to the light based on the accelerometer signals processed by the filtering unit 26. The LED control unit is only powered once the signals from the accelerometer 14 exceed a first threshold. After the signals exceed that first threshold, they are filtered by the filtering unit 26 and then further analyzed by the LED control unit 28. The LED control unit 28 analyzes the filtered accelerometer signal and determines whether the LEDs 18 should be illuminated based on the intended operation of the arrangement 10. For example, if the arrangement 10 is designed to detect vehicle braking, the LED control unit 28 may analyzed the filtered accelerometer signals and determine that an acceleration event is the result of vehicle braking, and provide power to the LEDs 18 accordingly, thus resulting in illumination of the LEDs 18. As another example, if the arrangement 10 is designed to detect vehicle turning, the LED control unit 28 may analyzed the filtered accelerometer signals and determine that an acceleration event is the result of a right turn or a left turn, and provide power to the LEDs 18 accordingly, thus resulting in illumination of the LEDs.

The LEDs 18 are configured to receive power from the power supply 12 and illuminate in order to provide an indication of a predetermined acceleration event. In particular, the LEDs may be configured to receive power from the power supply 12 and illuminate as the result of sudden vehicle deceleration, such as might occur during vehicle braking. In at least one embodiment, such vehicle braking must result in a deceleration of the vehicle that exceeds a predetermined threshold before the LEDs are illuminated. As a result, a quick tap of the brakes by a driver may or may not result in illumination of the LEDs 18. Instead, illumination of the LEDs 18 is dependent upon actual vehicle deceleration exceeding some threshold. Four LEDs 18 are shown in the embodiment of FIG. 1, including LEDs $18_1$, $18_2$, $18_3$ and $18_4$. It will be recognized by those of ordinary skill in the art that the four LEDs 18 of FIG. 1 are provided by way of example only, and more or fewer LEDs may be used in other embodiments of the arrangement 10.

In the embodiment disclosed herein the LEDs 18 serve as the lights of the arrangement 10, but it will be recognized that different types of lights may also be utilized in other embodiments. Furthermore, while FIG. 1 shows the LEDs as being contained within the housing 20, it will be recognized that the LEDs need not be contained in or carried by the housing, but are simply be connected to the electronic components within the housing in some manner. Accordingly, in at least one embodiment the power supply 12 and other electronic components including the accelerometer and processing unit 16 are retained within a first housing, but the LEDs are carried by a second housing. In such an arrangement, lead wires are used electrically connect the LEDs in the second housing to the power supply and electronic devices in the first housing. This arrangement allows the LEDs to be mounted at one location on a vehicle and the power supply and electronic components in the first housing to be mounted at a separate location. In yet another embodiment, various electronic components such as the acceleration sensor 14 and/or the processing unit 16 are retained within a first housing, but the LEDs and the power supply are carried by a second housing. In such an arrangement, the acceleration sensor 14 or processing unit 16 is configured to wirelessly transmit signals from the first housing to the second housing. This arrangement allows the second housing carrying the LEDs and power supply to be mounted at one location on a vehicle (e.g., a vehicle exterior) and the first housing carrying various electronic components to be mounted at a distant location on the vehicle (e.g., a vehicle interior).

The housing 20 is generally provided by a semi-rigid plastic material that forms a panel, board, casing, enclosure or other protection for the components of the arrangement 10. The material used for the housing 20 may be, for example, a poly-vinyl-chloride (PVC), polypropylene (PP), or any of various other thermo-plastic materials. Other materials may also be used as will be recognized by those of ordinary skill in the art. In at least one embodiment, the power supply 12, accelerometer 14, processing unit 16 and LEDs 18 are all carried by the housing 20 by being contained completely, or at least partially, within a casing formed by the housing 20. In other embodiment, one or more of these components are carried by the housing with at least at least a portion of these components being exposed on the housing 20.

At least one mounting member 30 is carried by the housing 20 and is configured to couple the housing to the vehicle. The mounting member 30 may be provided in any of various forms. For example, the mounting member 30 may be provided by a suction device, such as those commonly used to mount GPS units and other accessories to automotive vehicle windows. In at least one embodiment, the mounting member 30 may be an adhesive member that is used to adhere the housing 20 to a surface of the vehicle. In such embodiment, the adhesive member may be provided by an adhesive material that is connected directly to a vehicle surface or may include an intermediary component, such as two hook-and-loop fasteners used to attach the housing 20 to a vehicle surface. As another example, the mounting member may be a fastener, such as a threaded post, threaded receptacle, clip or other member configured to attach the housing to another component for connection to the vehicle.

In at least one embodiment, a calibration member 32 is carried by the housing and configured to deliver a calibration signal to the processing arrangement 16. The calibration signal is intended to indicate an orientation of the accelerometer when the housing 20 is mounted in the vehicle in a steady-state position. In at least one embodiment, the calibration member 32 is a depressible button provided on the housing. In other embodiments, the calibration member 32 may be provided in other forms, such as a mechanical switch, input code, or any of various other devices or means. After the housing 20 is mounted to the vehicle, the user simply activates the calibration member to send a signal to the LED control unit 28 indicating that the arrangement 10 is mounted and in a steady state condition. In this condition, the accelerometer will only be subject to a 1 G force resulting from the earth's gravity. The LED control unit 28 is then able to determine a baseline signal output for the accelerometer 14 in the steady state condition. This steady-state output provides an indication of the orientation of the vehicle-mounted accelerometer 14 and is used in interpreting subsequent acceleration signals during acceleration events. The orientation of the accelerometer on the vehicle is useful in determining whether an acceleration event is the result of an acceleration of the vehicle or deceleration of the vehicle, a right turn, or a left turn. Accordingly, the calibration member 32 allows the housing 20 to be mounted in any of various orientations and locations on the vehicle, as decided by the user while still allowing the processing unit 16 to properly interpret acceleration events.

In at least one alternative embodiment, the calibration member 32 is a button that also serves as a demo button such that depression of the button results in activation of the LEDs 18. In this embodiment, depression of the calibration member 32 causes the calibration signal to be sent to the processing unit 16. The calibration signal not only indicates the mounted orientation of the arrangement 10 but also indicates to the processing unit 16 that the LEDs should be illuminated. When the processing unit 16 receives the calibration signal, the processing unit allows power to flow to the LEDs 18, and the LEDs 18 are illuminated. Accordingly, when the arrangement 10 is sold in stores, a customer may depress the demo button to see what the device will do when an acceleration event is detected. Packaging for the arrangement 10 may further include text that prompts the customer to press the button for a demonstration of the product. After purchase, the demo button is still useful, as it serves as the calibration member 32, as discussed above. In this embodiment, depression of the calibration member 32 after mounting will result in flashing of the LEDs along with an indication of the orientation of the device.

Figure 2:
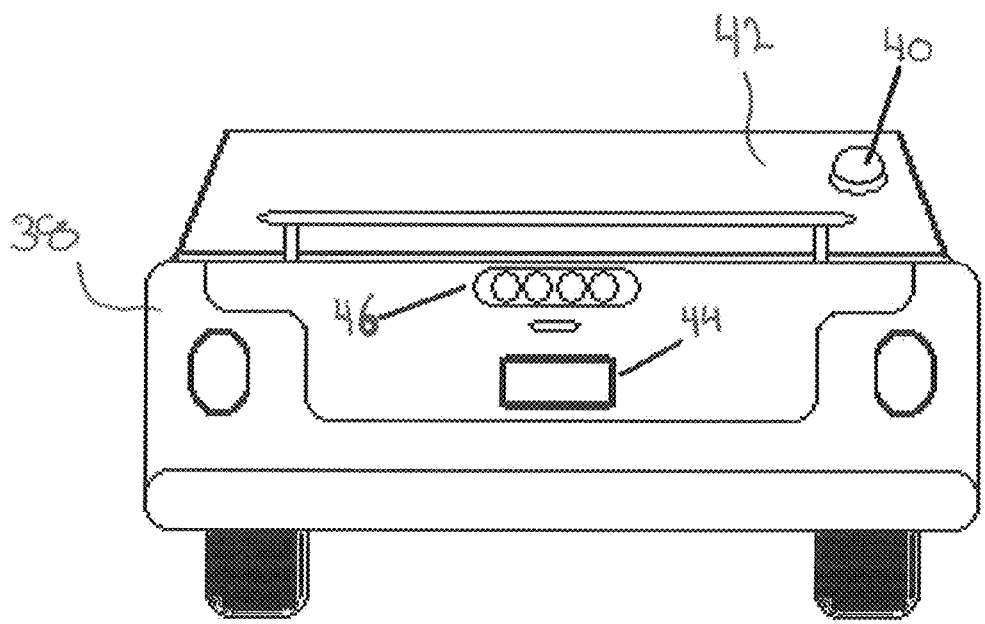
FIG. 2 is an exemplary installation of the arrangement of FIG. 1 positioned in an automobile.

FIG. 2 shows one embodiment of a device 40 that includes the arrangement 10 for detecting acceleration events installed at various locations on a vehicle in the form of an automobile 38. Device 40 is installed onto the rear windshield of an automobile 38. Device 40 may be installed on the exterior or interior window 42 of the automobile 38 with using a mounting member, such as a suction cup or a sticker. Alternatively, the device 40 may be installed in other locations on the vehicle 38. For example, the device 40 may be built into a license plate frame 44. In yet another embodiment, the device may be adapted to directly control the Center High Mount Stop Lamp (CHMSL) 46. While the vehicle shown in FIG. 2 is an automobile 38, it will be recognized by those of ordinary skill in the art that the arrangement 10 may be coupled to any other type of vehicle, including a motorcycle, truck, bicycle, boat, snowmobile, etc. Furthermore, in at least one embodiment, the arrangement 10 may be coupled to a vehicle-related component or device that is simply configured to move along with a vehicle, such as a motorcycle helmet, trailer, or other device.

As mentioned previously, the device 40 of FIG. 2 is not connected to the factory installed brake light system on the vehicle 38. As such, the device 40 is not connected to any mechanical or electrical components that are concealed within the vehicle or underneath the vehicle. Therefore, the device 40 is not connected to the brake detection line that is internal to the vehicle and is not connected to any wiring harness, brake light, or brake-light socket that is a factory installed or original equipment component of the vehicle. The device 40 may be powered using a variety of methods. In one embodiment, the device 40 may be battery powered. In another embodiment, the device 40 may be powered piezo-electrically, through the vibrations of the vehicle. In yet another embodiment, the device may be powered using solar energy.

Figure 3:
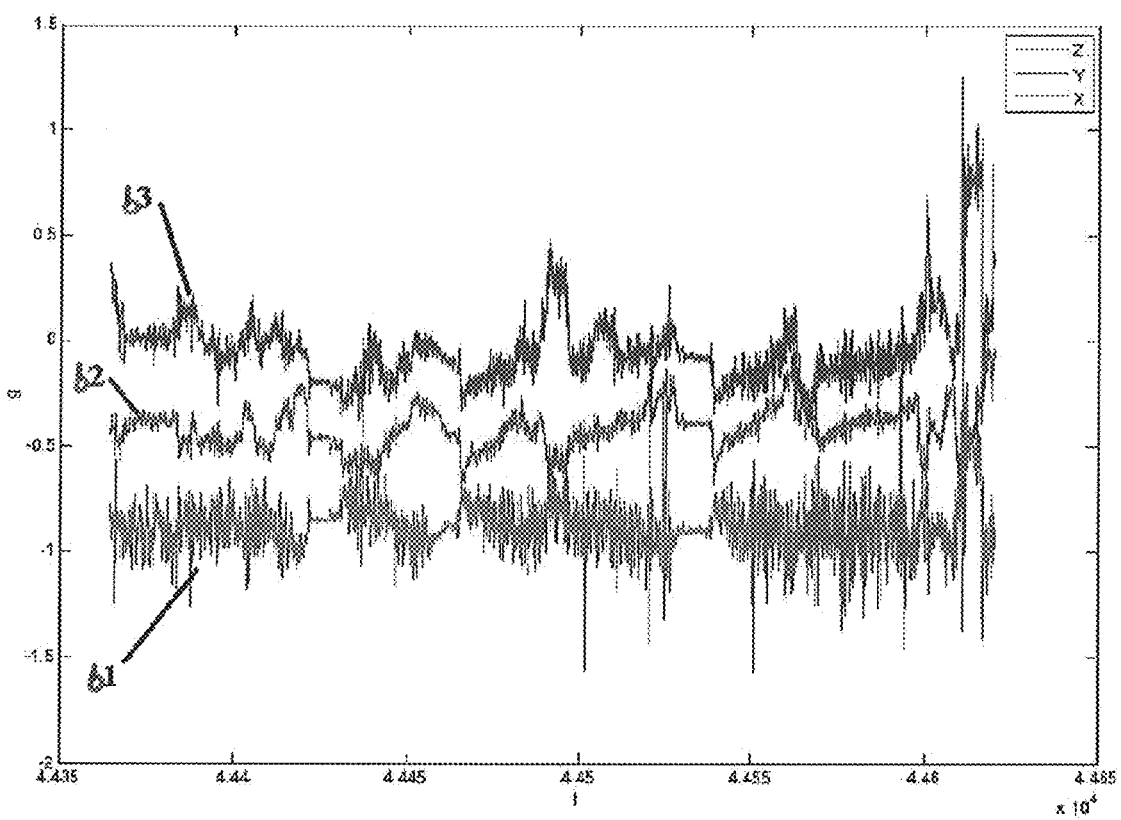
FIG. 3 is a data plot showing exemplary accelerometer data from the arrangement of FIG. 1.

FIG. 3 shows exemplary accelerometer data, gathered by using the accelerometer 14 found within the arrangement 10 for detecting acceleration events. Raw acceleration data in the X, Y, and Z directions, 61, 62, and 63, respectively, was plotted as a function of time. The data was retrieved from the accelerometer at a sampling frequency of 10 Hertz, or every 100 milliseconds. The accelerometer is oriented such that the X direction 61 is nearly vertical, resulting in the earth's gravity producing about −0.8 G acceleration. Similarly, the Y direction 62 has an average of about −0.5 G produced by earth's gravity. The Z direction is approximately parallel to the vehicle's driving direction and, consequently, the acceleration and deceleration of vehicle produces the most fluctuation in the Z direction data 63.

As can be seen in FIG. 3, the acceleration data contains significant noise. Although the Z direction data 63 shows fluctuation when the vehicle is in acceleration or deceleration, the noise in the data makes it hard to produce a meaningful curve for further investigation into the brake action. One of the causes for the noise is the unstable condition when the vehicle is driving. The quality and sensitivity of the accelerometer may also be a source of noise.

Generally, the noise in the acceleration data is composed primarily of high frequencies. Particularly, the noise is typically much higher in frequency than the fluctuations that result from the acceleration and deceleration of the vehicle. As a result, the unwanted noise can be effectively removed by the application of a low-pass filter.

The processing unit 16 is configured to continuously receive acceleration signals from the accelerometer in the X, Y and Z directions. As mentioned previously, a resultant vector may also be provided by the accelerometer 14, or the resultant vector may be derived within the processing unit 16. In at least one embodiment, a rolling sample window is used to perform the signal processing within the processing unit 16 every 100 ms. In this embodiment, low-pass filtering is performed by the filtering unit 26 for every 100 sample points. Every one second the older data points in the rolling sample window are replaced by more recent data points. In order to apply the low-pass filter to the data points, an FFT calculation is performed on the 100 sample points to obtain the spectrum of the points. Then, a low-pass filter is applied to remove all high frequency signals. After that the inverse FFT is applied to convert the spectrum back into real space.

Figure 4:
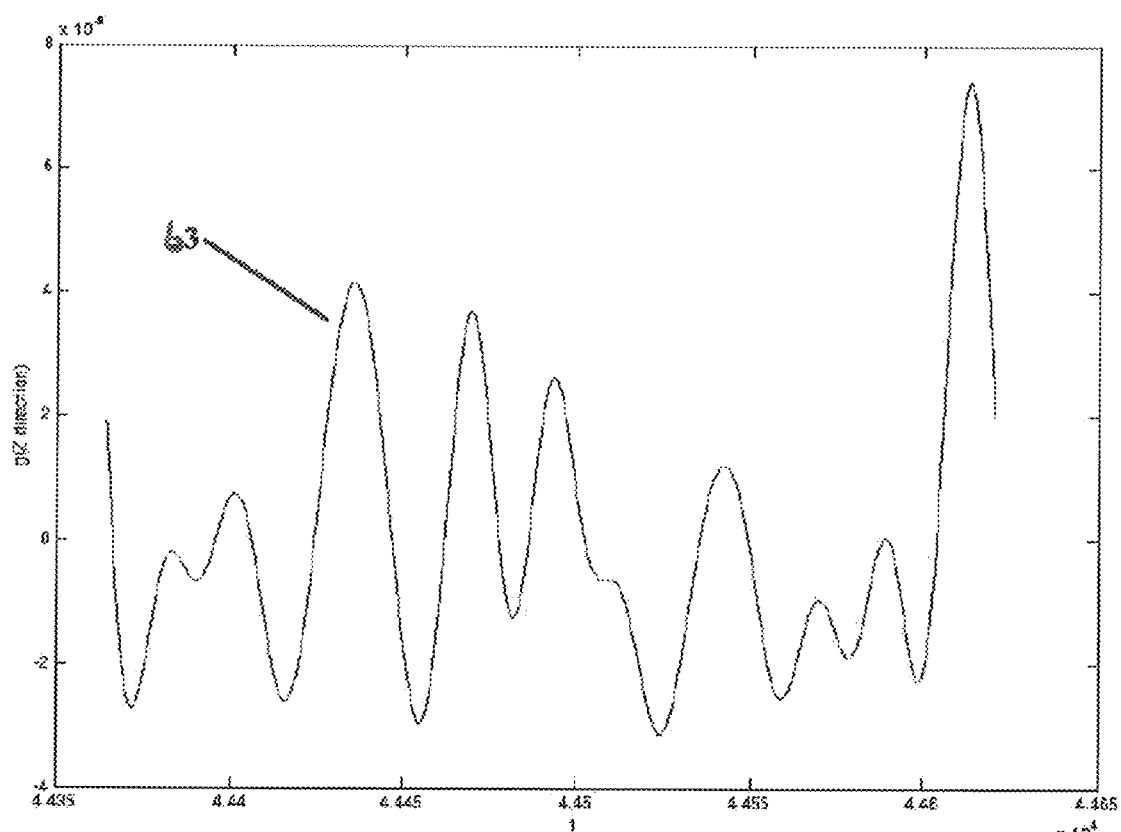
FIG. 4 is a data plot showing exemplary filtered accelerometer data of FIG. 3.

FIG. 4 shows exemplary filtered Z direction data 63. In this example, the constant bias was removed from the data by subtracting the average value of all data points from each data point, and then a low-pass filter was applied to the data. As can be seen, the high frequency signal spikes caused by the sensitivity of the accelerometer and its base-line electronic noise, as well as noise caused by driving conditions other than acceleration and braking, have been removed by the low-pass filter. The low frequency data provides a much better foundation for investigating the relationship between braking and fluctuations in the data.

Figure 5:
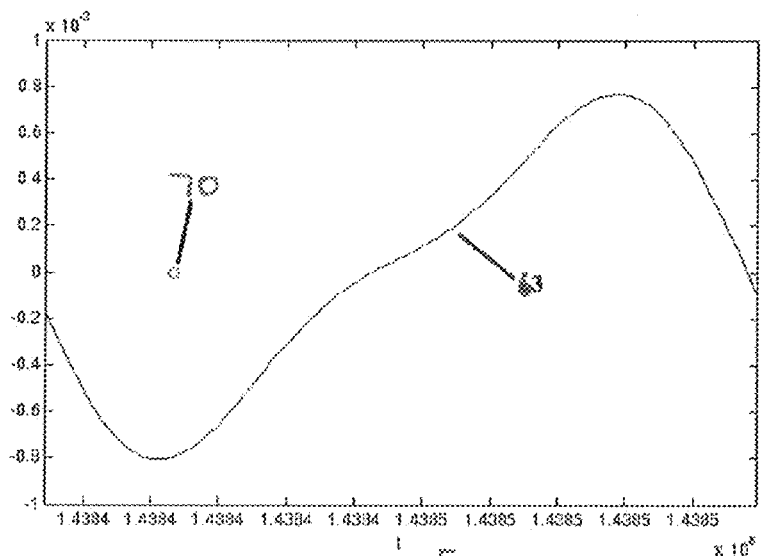
FIG. 5 is a data plot showing a first exemplary local minimum of filtered accelerometer data and a corresponding braking time using an arrangement such as that shown in FIG. 1.
Figure 6:
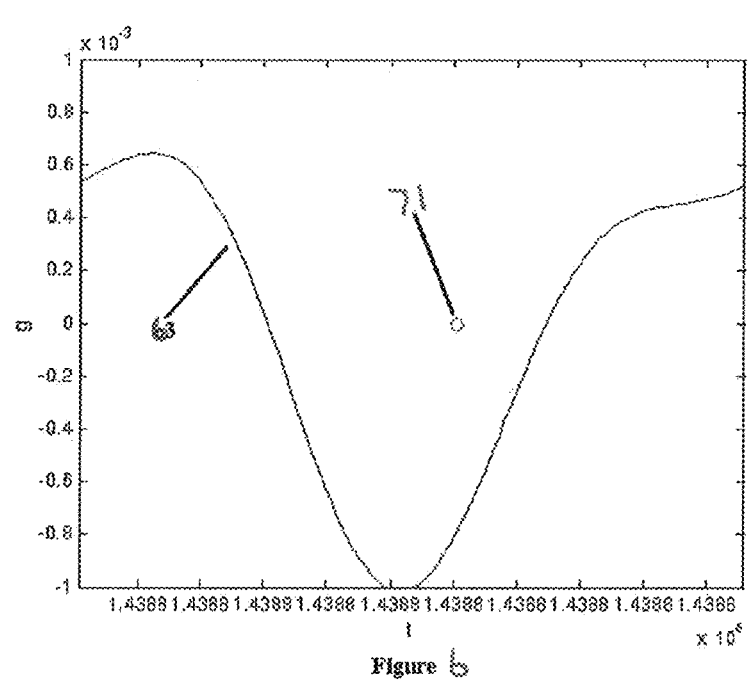
FIG. 6 is another data plot showing a second exemplary local minimum of filtered accelerometer data and a corresponding braking time using an arrangement such as that shown in FIG. 1.

The local minimums of processed data are used as a good indication of braking. FIGS. 5 and 6 show the filtered Z direction data 63 near two selected time points where the brake pedal was pressed during two separate instances of acceleration events. The low points of the processed data generally match the brake action. FIGS. 5 and 6 also show dots, 70 and 71, respectively, that generally correspond to the time when the brake pedal was pressed (i.e., a user attempted to mark these times along with the moment of braking). As can be seen in the figures, the data reaches a local minimum around the time when the brake pedal was pressed (human error accounts for the marked time at doest 70 and 71 being slightly offset from the minimum). This data shows that local minimums may be used to detect acceleration events. The acceleration events may result in illumination of the LEDs 18 if the magnitude of the processed acceleration signals exceeds a predetermined threshold, such that the minimums are indicative of a braking event or a turning event for the vehicle.

Figure 7:
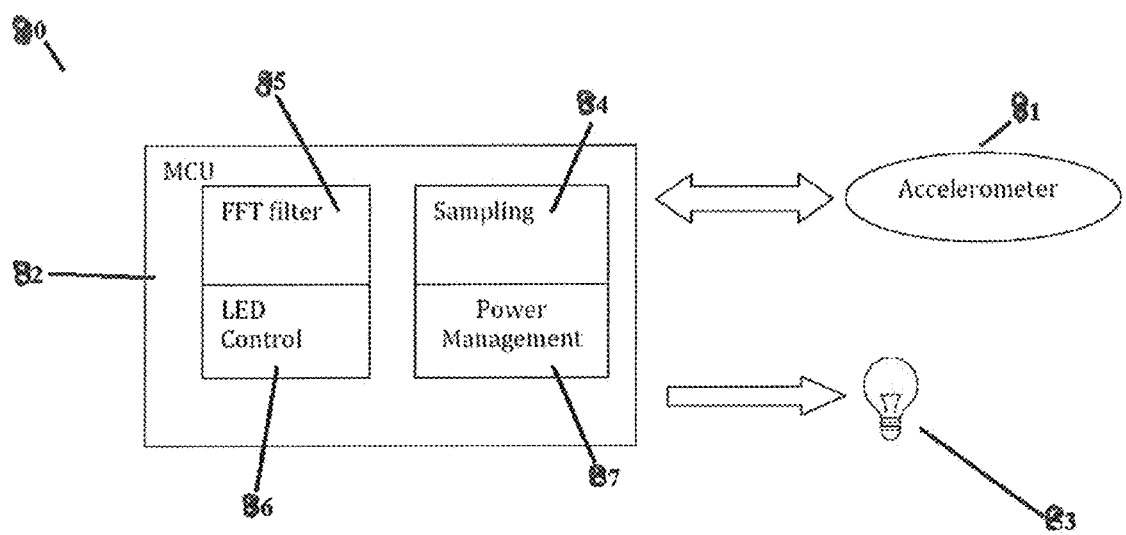
FIG. 7 is a system diagram of the arrangement disclosed herein showing one embodiment of the brake detection system.

FIG. 7 shows a simplified system diagram for one embodiment of a system for automatic brake detection when a vehicle is being driven. The brake detection system 80 includes an accelerometer 81, a micro-control unit (MCU) 82, and an LED 83. Accelerometer 81, preferably a high sensitivity and low noise accelerometer, is used to obtain the acceleration in three directions, such as X, Y, and Z. MCU 82 is a microcontroller or digital signal processor that constantly pulls the acceleration value in the X, Y and Z direction from the accelerometer at a sampling rate, such as 10 Hz. MCU 82 then processes the data from the accelerometer by filtering out the high frequency signals, and then applies an algorithm to calculate if the vehicle is braking. MCU 82 then outputs so as to turn on LED 83 in a desired manner and for a desired period, if a braking event is detected. MCU 82 will additionally provide the necessary power management for the system if the device is to be a battery operated device. In the embodiment show in FIG. 7, MCU 82 includes: a sampling component 84, which samples data from accelerometer 81; an FFT Filter component 85, which performs the filtering on the sampled data; an LED control component 86, which controls LED 83, and a power management component 87, which manages power for the system. Preferably, these components combine to form a self-contained package.

As noted above, due to the gravity of the earth, the accelerometer will always indicate an acceleration of 1G towards the center of earth. Ideally, the device 40 could be mounted such that one direction (e.g., the Z direction) of the accelerometer is aligned with the direction of gravity and another direction (e.g., the Y direction) is aligned with the direction of the motion of the vehicle. With the device 40 oriented as such, the process can be simplified by only processing the Y direction acceleration data. However, in most applications, the device 40 will not be mounted in a perfect orientation relative to the vehicle. In this instance, the baseline acceleration values caused by the gravity of earth must be subtracted from the data as it is collected from the accelerometer in order to ensure accuracy. One approach for calculating the baseline acceleration is to average each of the X, Y, and Z direction acceleration data sets while the vehicle is in an idle state and to then use those averages as the baseline acceleration for each of the corresponding directions. These baseline acceleration values are unique to the orientation of the accelerometer. During operation of the device 40, the baseline acceleration values for the X, Y and Z axis are subtracted out of the collected data points in an attempt to obtain better accuracy for the acceleration data.

In one embodiment, a rolling sampling window is used to perform the signal processing. For example, a sample window of 100 samples, or 10 seconds, could be used. Older data would be replaced by the latest data points periodically, such as every second. Each time the sample window is updated, a low-pass filter would be applied. One option for implementing the low-pass filter is to perform a Fast Fourier Transform (FFT) on the data to obtain the frequency spectrum of the data in the sample window. A filter is then applied to remove all high frequency components of the signal. Finally, an inverse FFT is performed on the frequency spectrum data to return it to the time domain.

In one embodiment, the following method is used to calculate whether the brake is pressed on the vehicle in various situations. If the device is mounted in the ideal situation, a local minimum of the acceleration value in the driving direction may be used as an indication that the vehicle is braking. For other cases, the amplitude of the difference between the current acceleration data point and a pre-calculated baseline acceleration of the earth may be calculated. This value is then compared with a selected threshold value of deceleration that has been selected to indicate the detection of a brake event. The vehicle would be considered braking when the calculated value is greater than the selected threshold value. The indicator, such as a flashing LED, may then be activated to indicate the detection of the braking event (or other deceleration event).

Figure 8:
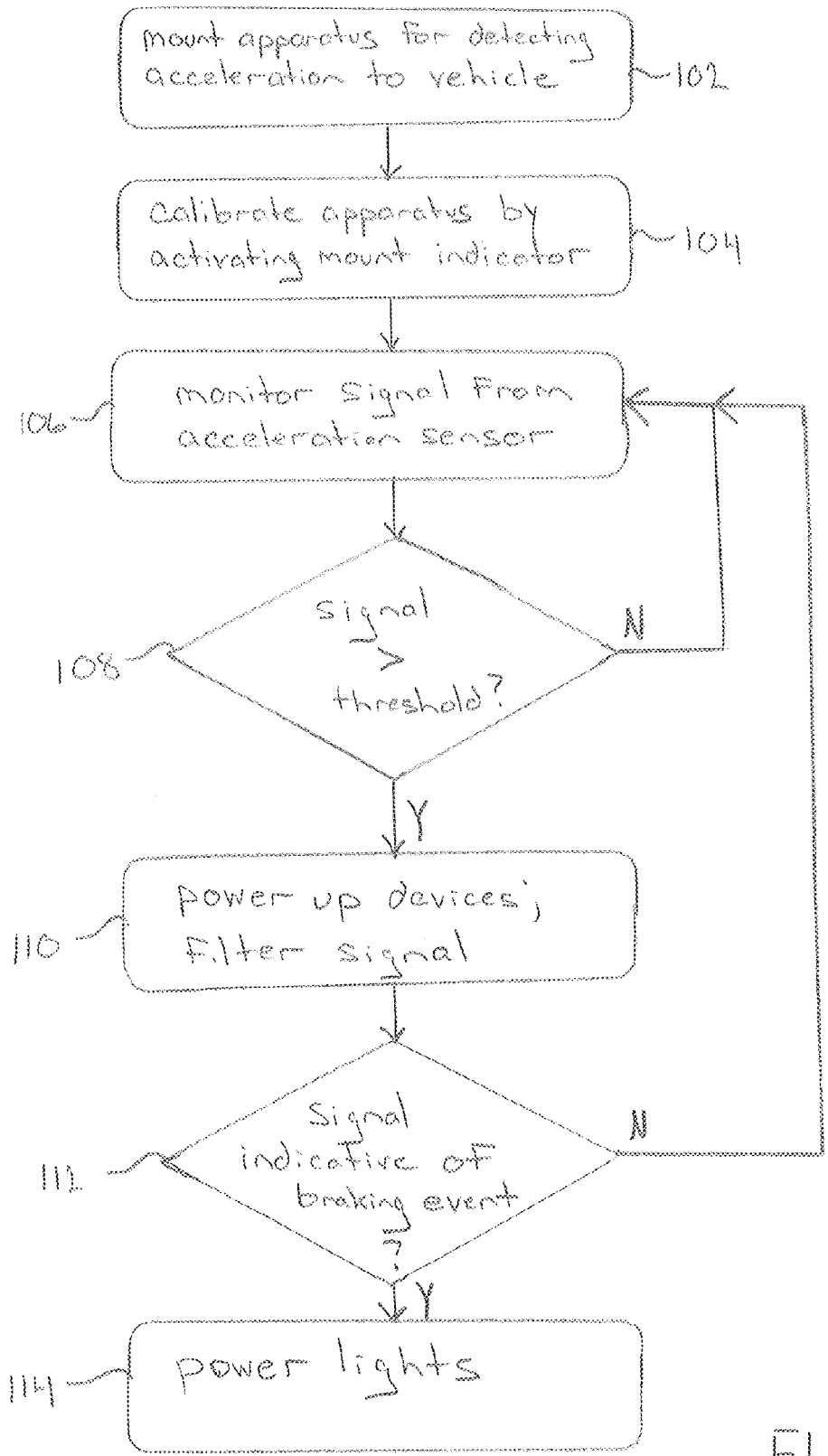
FIG. 8 is a flowchart showing a method of signaling deceleration in vehicles.

With reference now to FIG. 8, a method is disclosed for detecting an acceleration event in a vehicle having a brake detection line and at least one brake light coupled to the brake detection line. In block 102, the method comprises mounting an apparatus for detecting acceleration to the vehicle without coupling the apparatus for detecting acceleration to the brake detection line or the at least one brake light. As shown in block 104, the method further comprises calibrating the apparatus for detecting acceleration to determine the orientation of the apparatus for detecting acceleration after the apparatus for detecting acceleration is mounted to the vehicle. Calibration may result from the user pressing a button, throwing a switch, or otherwise indicating that the apparatus is mounted on the vehicle. Once the apparatus is mounted, the signal from the accelerometer is monitored, as noted in block 106. A processing unit is powered up if the magnitude of the signal from a detected acceleration event exceeds a predetermined threshold, as shown in blocks 108 and 110. Thereafter, the signal from the detected acceleration event is low-pass filtered using any of various filtering techniques, such as fast-Fourier transform. Then, as noted in blocks 112 and 114, power is provided to a light, such as an LED, if the filtered signal from the detected acceleration event is indicative of a vehicle braking event or vehicle turning event.

As described above, a system and method for deceleration detection is disclosed herein that includes the use of an accelerometer to detect acceleration events, such as braking of a vehicle. The term "acceleration event" as used herein refers to an instance of acceleration or deceleration in any of various directions including, for example, acceleration in a forward direction, deceleration in the forward direction, right acceleration and left acceleration. While vehicle braking is described herein as being one cause of an exemplary acceleration event, it will be appreciated that in various embodiments acceleration events may be the result of other actions, including lifting off the throttle, scrubbing speed while cornering, engine shut-off, missed shift event, or any of various other actions as will be recognized by one of ordinary skill in the art.

An accelerometer is used to detect reductions in speed that may indicate that the vehicle is braking or otherwise decelerating. When the system detects the vehicle is decelerating (e.g., braking), it activates an indicator. One advantage of the arrangement disclosed herein is that it does not require complex installation. The device can be built as an entirely self-contained system that may be installed quickly and effortlessly by the user by merely attaching it to the vehicle and calibrating the device.

In a first embodiment, the device includes an accelerometer, a processing unit, and an indicator. The processing unit is operably connected to accept accelerometer data, and configured to output to the indicator when braking is detected based on the accelerometer data.

In some embodiments, the processing unit includes a sampler, a filter, and an indicator controller. The sampler is operably connected to receive data from the accelerometer. The filter is operably connected to filter the sampled data. The indicator controller is configured to accept data from the filter, determine whether the vehicle is braking, and output to the indicator whether the vehicle is braking. Optionally, the processing unit may further include a power management unit.

In another embodiment, the indicator is a light, preferably an LED lamp. When braking is detected, the light is turned on. In at least one embodiment, the light is flashed for some period of time (e.g., four flashes in two seconds) instead of constant illumination when an acceleration event resulting from braking is detected. In at least one alternative embodiment the light is flashed for some period of time and then held constant to further alert the rearward driver of the detected acceleration event. For example, the LED control unit 28 may be configured to operate the LEDs 18 similar to the arrangement shown in U.S. Pat. No. 5,565,841 to Pandohie, the contents of which are incorporated herein by reference in their entirety.

As discussed above, in at least some embodiments, the device may be battery powered, solar powered, or piezoelectrically powered. In some additional embodiments, accelerometer data is sampled for a limited sample window. As new sample data is received, old data is removed. In still other additional embodiments, accelerometer data is filtered using a low-pass filter to remove noise. In yet another embodiment, the processing unit detects braking when acceleration data has a local minimum.

In still another embodiment, the processing unit detects braking when acceleration data exceeds a selected triggering threshold. This triggering threshold is selected such that the device will only detect or indicate deceleration events of a certain magnitude. The triggering threshold means that the device will only signal a significant deceleration event that is not merely an insignificant deceleration. As a result, nuisance indications of deceleration are avoided.

What is claimed is:

1. An arrangement for detecting acceleration events in a vehicle having a brake light system coupled to a vehicle battery, the arrangement comprising:
    a housing;
    an accelerometer carried by the housing;
    a power supply carried by the housing;
    a light coupled to the housing;
    a processing arrangement carried by the housing in communication with the accelerometer, the processing arrangement including a signal filter configured to process signals received from the accelerometer, and a light controller configured to deliver power from the power supply to the light based on the accelerometer signals processed by the signal filter, wherein none of the power supply, the light, and the processing arrangement are coupled to the brake light system of the vehicle;
    a mounting member carried by the housing and configured to couple the housing to the vehicle; and
    a calibration member carried by the housing and configured to deliver a calibration signal to the processing arrangement indicating an orientation of the accelerometer when the housing is mounted in the vehicle, wherein the calibration member is a button provided on the housing, the calibration member also serving as a demo button such that depression of the button results in illumination of the light.

2. The arrangement of claim 1 wherein the accelerometer is a MEMs 3-axis accelerometer.

3. The arrangement of claim 1 wherein the power supply is a battery, solar cell or a piezoelectric device.

4. The arrangement of claim 1 wherein the light comprises at least one LED.

5. The arrangement of claim 1 wherein the signal filter is configured to perform low-pass filtering on the signals received from the accelerometer.

6. The arrangement of claim 1 wherein the light controller is configured to provide power to the light upon detection of a vehicle braking event.

7. The arrangement of claim 1 wherein the light controller is configured to provide power to the light upon detection of a vehicle turn event.

8. The arrangement of claim 1 wherein the mounting member is a suction device or an adhesive member.

9. The arrangement of claim 1 wherein the processing arrangement includes a power management device configured to provide power from the power supply to the signal filter and the light control only when a signal from the accelerometer is greater than a predetermined threshold.

10. An apparatus for detecting acceleration events in a vehicle having a vehicle brake light system coupled to a vehicle battery, the apparatus comprising:
    a power supply separate from the vehicle brake light system and the vehicle battery;
    an acceleration sensor separate from the vehicle brake light system;
    a light separate from the vehicle brake light system;
    a processing unit in communication with the acceleration sensor, the processing unit including a light controller configured to deliver power from the power supply to the light based on signals from the acceleration sensor;
    a mounting member configured to couple the power supply and the light to the vehicle; and
    a calibration member provided as an activatable switch, wherein activation of the switch delivers a calibration signal to the processing unit.

11. The apparatus of claim 10 further comprising a power management device configured to provide power from the power supply to the light controller only when a signal from the acceleration sensor is indicative of an acceleration event having a magnitude that is greater than a predetermined threshold.

12. The apparatus of claim 10 wherein the acceleration sensor is a 3-axis accelerometer.

13. The apparatus of claim 10 wherein the acceleration sensor is a GPS device.

14. The apparatus of claim 10 wherein the power supply, the light, and the processing unit are mounted in a common housing with the acceleration sensor.

15. The apparatus of claim 10 wherein the light controller is configured to provide power to the light upon detection of a vehicle braking event or a vehicle turn event.

16. The apparatus of claim 10 wherein the mounting member is a suction device or an adhesive member.

17. The apparatus of claim 10 wherein the activatable switch includes a button, wherein the calibration switch is configured such that depression of the button results in (i) delivery of the calibration signal to the processing unit indicating that the acceleration sensor has been mounted in the vehicle with a particular orientation, and (ii) illumination of the fight.

18. A method of signaling an acceleration event in a vehicle having an internal brake light system, the method comprising:
    mounting an apparatus for detecting acceleration events to the vehicle without coupling the apparatus for detecting acceleration events to the brake light system of the vehicle;
    activating a calibration switch to send a calibration signal;
    calibrating an acceleration sensor of the apparatus for detecting acceleration events to determine an orientation of the acceleration sensor after the apparatus for detecting acceleration events is mounted to the vehicle and the calibration switch is activated;
    powering a processing device if a signal from the acceleration sensor indicates that an acceleration event exceeds a predetermined threshold;
    filtering the signal from the acceleration sensor; and
    providing power to a light if the filtered signal from the acceleration signal is indicative of a vehicle braking event or vehicle turning event.

19. The method of claim 18 wherein the calibration switch includes a calibration button and wherein activation of the calibration switch occurs upon depression of the calibration button.

20. The method of claim 18 further comprising illuminating the light when the calibration switch is activated such that activation of the calibration switch (i) calibrates the acceleration sensor and (ii) provides an operational demo of the light.

* * * * *